United States Patent [19]

Sauer

[11] 4,077,760
[45] Mar. 7, 1978

[54] INJECTION MOLDING PROCESS AND APPARATUS

[75] Inventor: Donald G. Sauer, Harwinton, Conn.

[73] Assignee: National Can Corporation, Chicago, Ill.

[21] Appl. No.: 734,410

[22] Filed: Oct. 21, 1976

Related U.S. Application Data

[63] Continuation of Ser. No. 511,769, Oct. 3, 1974, abandoned.

[51] Int. Cl.² .............................................. B29F 1/03
[52] U.S. Cl. .................................... 425/562; 425/577
[58] Field of Search ................... 425/145, 245 R, 185, 425/190, 183, 249, DIG. 245, DIG. 246, DIG. 247, 542, 562, 577

[56] References Cited

U.S. PATENT DOCUMENTS

| 3,050,084 | 8/1962 | Palfey | 425/DIG. 224 |
| 3,183,553 | 5/1965 | Slater | 425/449 X |
| 3,559,581 | 2/1971 | Kriz et al. | 425/249 X |
| 3,787,159 | 1/1974 | Bielfeldt | 425/245 X |
| 3,894,823 | 7/1975 | Hanning | 425/245 R X |

FOREIGN PATENT DOCUMENTS

| 2,425,621 | 12/1975 | Germany | 425/245 R |

Primary Examiner—Francis S. Husar
Assistant Examiner—William R. Briggs
Attorney, Agent, or Firm—Marn & Jangarathis

[57] ABSTRACT

There is disclosed a gating assembly provided with at least two orifices of different diameters and associated with an injection molding assembly. In an initial stage of extruding the plastic material into a mold cavity, the orifice of larger diameter is utilized to provide the fluid communication between the extruder nozzle and mold cavity whereas the orifice of smaller diameter is utilized in the final stages of injection to insure thorough packing of the plastic material in the injection mold.

4 Claims, 2 Drawing Figures

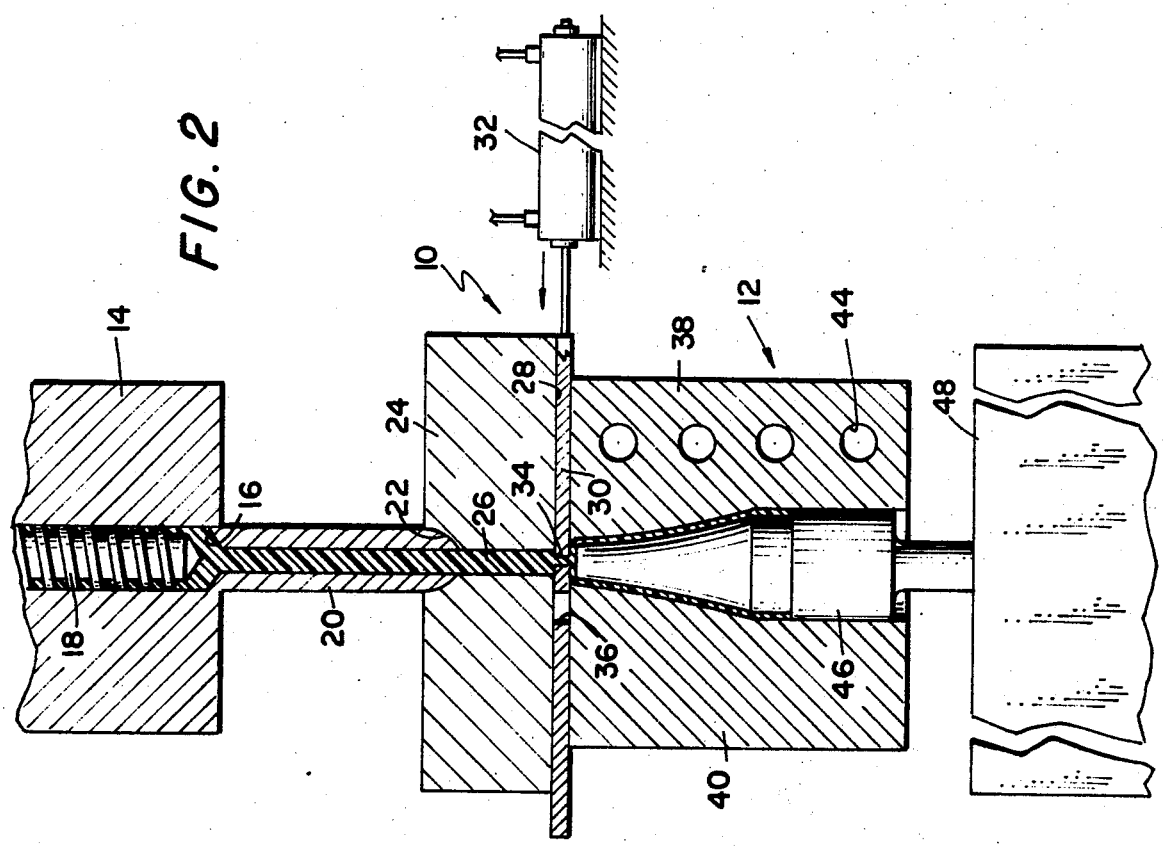
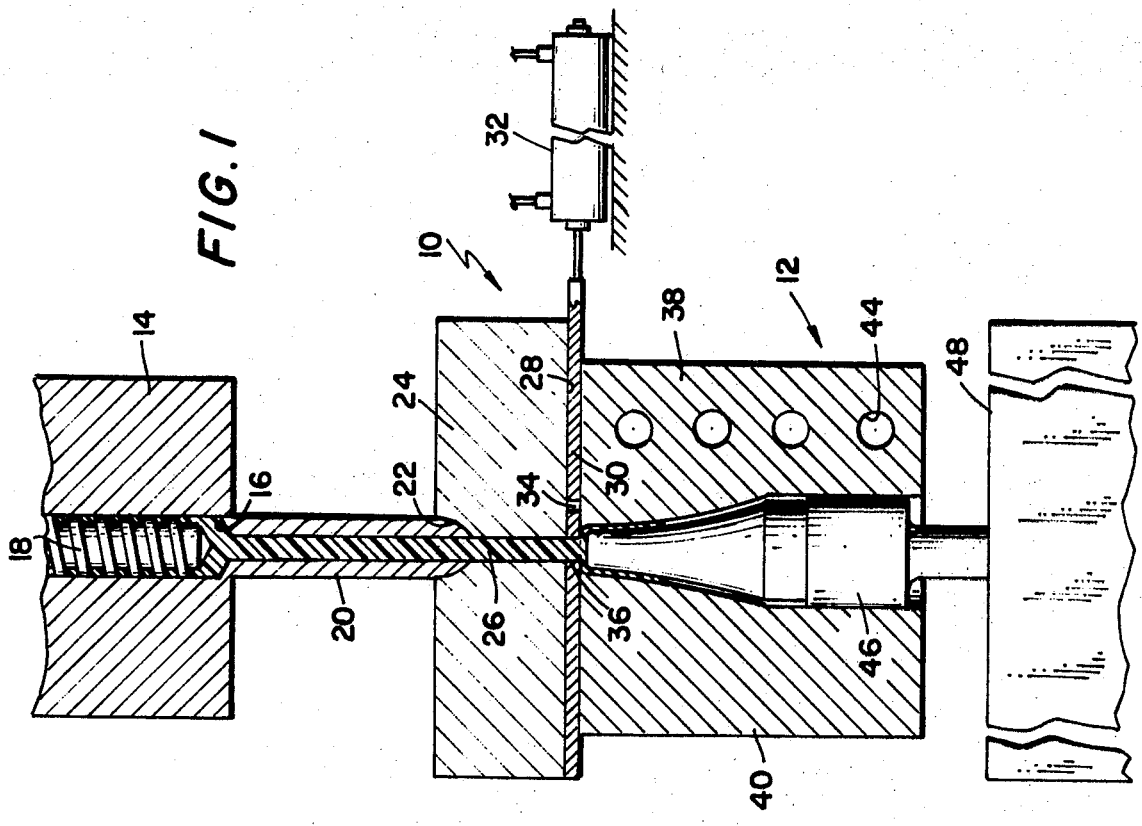

INJECTION MOLDING PROCESS AND APPARATUS

This is a continuation of application Ser. No. 511,769, filed Oct. 3, 1974, now abandoned.

BACKGROUND OF THE INVENTION

This invention relates to injection molding, and more particularly to an extrusion assembly for dispensing or introducing a plastic material in fluid condition into an injection mold.

With an injection assembly in operative association, molding material is injected from an extrusion mechanism along an injection passageway into mold cavity through a sprue bore of the injection head. Generally, the mold material is allowed to solidify in the mold cavity whereupon the mold assembly is opened and the molded article removed.

Recently, a process has been advanced which produced a barrier container, i.e., a semi-rigid plastic container provided with a liner or inner layer of another material or materials having properties different than the outer layer thereof. In accordance with such process a performed liner or sleeve (manufactured, for example by thermoforming techniques) is positioned over a core rod with a parison or preform being subsequently formed about the liner in an injection station of an injection blow molding machine to form a composite container. As disclosed in co-pending application Ser. No. 448,191, filed Mar. 5, 1974 and assigned to the same assignee as the present invention, the composite parison is transferred to a blow mold for the expansion of such composite parison, as known by those skilled in the art.

Injection assemblies are capable of generating high pressures, e.g., the range of from about 2,000 to 10,000 psig., and depending on the plastic materials being used and characteristic thereof, the produced laminated container may be imperfect due to the shearing effects of the hot plastic material on the liner during formation of the composite parison in the injection mold.

OBJECTS OF THE INVENTION

An object of the present invention is to provide an improved process and apparatus for extruding a plastic material into an injection mold which overcome the problems of the prior art.

Still another object of the present invention is to provide an improved process and apparatus for extruding a plastic material into an injection mold in the formation of a composite parison whereby shearing of the preform or liner is substantially eliminated.

Another object of the present invention is to provide a novel gating assembly for an injection molding process and apparatus.

Various other objects and advantages of the invention will become clear from the following detailed description of an exemplary embodiment thereof and the novel features will be particularly pointed out in connection with the appended claims.

SUMMARY OF THE INVENTION

In accordance with the present invention, there is provided a gating assembly associated with an injection molding assembly whereby the gating assembly is provided with at least two orifices of different diameters. As more fully hereinafter described, in an initial stage of extruding the plastic material into a mold cavity, the orifice of larger diameter is utilized to provide the fluid communication between the extruder means and mold cavity for primary filling of the cavity whereas the orifice of smaller diameter is utilized in final stages of injection to insure thorough packing of the plastic material in the injection mold.

BRIEF DESCRIPTION OF THE DRAWINGS

The invention will be more clearly understood by reference to the following detailed description of an exemplary embodiment thereof in conjunction with the accompanying drawings in which:

FIG. 1 is a partial side view, partially in section, of an injection molding machine embodying the principles of the present invention in an initial filling mode; and FIG. 2 is a partial sectional side view of the injection molding machine of FIG. 1 illustrating the gating assembly in another filling mode.

DETAILED DESCRIPTION OF THE INVENTION

For a general understanding of a four stage rotary injection blow molding machine in which the invention may be incorporated for the production of barrier containers, reference may be made to the aforementioned co-pending application Ser. No. 448,191, filed on Mar. 5, 1974.

Referring now to FIG. 1, there is illustrated an injection molding assembly comprised of an extrusion assembly, generally indicated as 10, juxtaposed to mold and platen assembly, generally indicated as 12.

The extrusion assembly 10 is comprised of a barrel 14 having a cylindrically-shaped chamber 16 in which an extruder screw 18 is centrally disposed for forcing a plastic material therethrough, as known to those skilled in the art. The extrusion assembly 10 includes an extrusion nozzle 20 extending from the barrel 14, with the end of the nozzle 20 opposite the barrel 14 being positioned within, a hemispherically-shaped depression 22 formed in an injection head 24 having a sprue 26. The injection head 24 is formed with a slot 28 in which a gate plate 30 is mounted for reciprocal movement by an air cylinder 32 associated therewith. The gate plate 30 is formed with small and large orifices 34 and 36 respectively, as more clearly hereinafter described.

The mold and platen assembly 12 is comprised of mold halves 38 and 40 defining a contoured cavity surface 42 and may include orifices 44 for the passage of a suitable heat transfer medium. Within the mold halves 38 and 40 there is disposed a cylindrically-shaped core rod, generally indicated as 46, mounted on a platen 46 in a manner known to those skilled in the art.

In operation, upon completion of an indexing operation and the closing of the mold halves 38 and 40, the gate plate 28 is moved to place the cavity formed by the injection mold halves 38 and 40 in fluid communication via orifice 36 with the extruder nozzle 20 to permit rapid filling of such cavity under moderate pressure. After filling the cavity to about 80 to 90% of capacity, the gate plate 28 is caused to be moved by the air cylinder 32 to a position where the nozzle 20 is in fluid communication with the cavity via the smaller orifice 34 whereby filling of the cavity is completed at higher pressure to insure complete compaction of the liquid plastic material in the cavity. Generally, it is desirable to move the gate plate 26 to an intermediate position to arrest fluid communication from the nozzle to the mold cavity prior to separation of the mold halves 38 and 40.

While the above invention has been described with reference to a gating assembly plate and its use in an injection molding assembly, that the apparatus and process of the present invention may be used in injection blow molding, per se, as well as in a process and apparatus for forming barrier containers.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

I claim:

1. In an injection molding machine having an assembly adapted to inject a plastic fluid molding material from an extrusion nozzle into an article forming cavity of said injection molding machine, the improvement comprising:

a gating means provided with first and second orifices, said first orifice having a diameter larger than said second orifice, said gating means being disposed between said extrusion nozzle and said article forming cavity; and motive means connected to said gating means for moving said gating means from a position wherein said first orifice is disposed between said extrusion nozzle and said article forming cavity to a second position wherein said second orifice is disposed between said extrusion nozzle and said article forming cavity during introduction of said fluid molding material through said orifices into said article forming cavity to thereby ensure thorough packing of said plastic material.

2. The machine as defined in claim 1 wherein said gating means is formed with more than two orifices.

3. The machine as defined in claim 1 where said gating means is provided with an intermediate position for positioning between said extrusion nozzle and said cavity to arrest the flow of material to said article forming cavity.

4. The machine as defined in claim 1 wherein a core rod is disposed in said article forming cavity.

* * * * *